United States Patent
Huang et al.

(10) Patent No.: US 10,660,058 B2
(45) Date of Patent: *May 19, 2020

(54) METHOD AND APPARATUS FOR AVOIDING CIRCUIT-SWITCHED CALL DROP IN MOBILE COMMUNICATIONS

(71) Applicant: MediaTek Inc., Hsinchu (TW)

(72) Inventors: Yu-Cheng Huang, Hsinchu (TW); Chien-Chun Huang-Fu, Hsinchu (TW); Marko Niemi, Oulu (FI)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/366,063

(22) Filed: Mar. 27, 2019

(65) Prior Publication Data
US 2019/0223133 A1    Jul. 18, 2019

Related U.S. Application Data

(63) Continuation of application No. 15/913,839, filed on Mar. 6, 2018, now Pat. No. 10,278,153.

(60) Provisional application No. 62/514,032, filed on Jun. 2, 2017.

(51) Int. Cl.
| | | |
|---|---|---|
| *H04W 4/00* | (2018.01) | |
| *H04W 60/06* | (2009.01) | |
| *H04W 24/10* | (2009.01) | |
| *H04W 60/02* | (2009.01) | |
| *H04W 76/18* | (2018.01) | |
| *H04L 12/66* | (2006.01) | |
| *H04W 8/24* | (2009.01) | |
| *H04L 12/00* | (2006.01) | |
| *H04W 36/00* | (2009.01) | |

(52) U.S. Cl.
CPC .......... *H04W 60/06* (2013.01); *H04W 24/10* (2013.01); *H04W 60/02* (2013.01); *H04W 76/18* (2018.02); *H04L 12/00* (2013.01); *H04L 12/66* (2013.01); *H04W 8/245* (2013.01); *H04W 36/0022* (2013.01)

(58) Field of Classification Search
CPC ....... H04W 8/04; H04W 60/04; H04W 60/00; H04W 8/245; H04W 24/02; H04W 88/02; H04W 40/26; H04W 88/06; H04B 1/005; H04B 1/006; H04L 12/00; H04L 12/66
USPC .................... 455/435.1, 552.1, 418; 370/352
See application file for complete search history.

(56) References Cited

U.S. PATENT DOCUMENTS

| | | | |
|---|---|---|---|
| 10,085,161 B1* | 9/2018 | Oroskar | ................ H04W 24/04 |
| 2012/0114488 A1* | 5/2012 | Giger | ...................... F16H 1/227 |
| | | | 416/170 R |
| 2012/0165013 A1* | 6/2012 | Nishida | ................. H04W 76/38 |
| | | | 455/435.1 |

(Continued)

*Primary Examiner* — Danh C Le
(74) *Attorney, Agent, or Firm* — Han IP PLLC; Andy M. Han

(57) ABSTRACT

Various solutions for avoiding circuit-switched call drop with respect to user equipment and network apparatus in mobile communications are described. An apparatus transmits a non-access stratum (NAS) message in a NAS signaling connection. The apparatus receives a NAS response message. The apparatus initiates a timer to control the NAS signaling connection. The apparatus further receives a circuit-switched (CS) service notification. The apparatus then stops the timer and execute a CS service procedure.

20 Claims, 7 Drawing Sheets

(56) References Cited

U.S. PATENT DOCUMENTS

| | | | |
|---|---|---|---|
| 2014/0087740 A1* | 3/2014 | Nakamura | H04W 36/14 |
| | | | 455/444 |
| 2016/0128112 A1* | 5/2016 | Dunsbergen | H04W 76/10 |
| | | | 455/41.2 |
| 2016/0262058 A1* | 9/2016 | Jeong | H04W 4/025 |
| 2016/0359586 A1* | 12/2016 | Hosokawa | H04L 1/14 |
| 2017/0048758 A1* | 2/2017 | Shu | H04W 8/06 |
| 2018/0332652 A1* | 11/2018 | Kim | H04W 88/02 |
| 2019/0053034 A1* | 2/2019 | Kim | H04W 8/08 |

* cited by examiner

METHOD AND APPARATUS FOR AVOIDING CIRCUIT-SWITCHED CALL DROP IN MOBILE COMMUNICATIONS

CROSS REFERENCE TO RELATED PATENT APPLICATION(S)

The present disclosure is part of a continuation of U.S. patent application Ser. No. 15/913,839, filed on 6 Mar. 2018I, which claims the priority benefit of U.S. Patent Application No. 62/514,032, filed on 2 Jun. 2017. Contents of aforementioned applications are incorporated by reference in their entirety.

TECHNICAL FIELD

The present disclosure is generally related to mobile communications and, more particularly, to avoiding circuit-switched call drop with respect to user equipment and network apparatus in mobile communications.

BACKGROUND

Unless otherwise indicated herein, approaches described in this section are not prior art to the claims listed below and are not admitted as prior art by inclusion in this section.

There are various well-developed and well-defined cellular communications technologies in telecommunications that enable wireless communications using mobile terminals, or user equipment (UE). For example, the Global System for Mobile communications (GSM) is a well-defined and commonly used communications system, which uses time division multiple access (TDMA) technology, which is a multiplex access scheme for digital radio, to send voice, video, data, and signaling information (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Long-Term Evolution (LTE), as well as its derivatives such as LTE-Advanced and LTE-Advanced Pro, is a standard for high-speed wireless communication for mobile phones and data terminals. In addition, there are some newly developed next generation communication technologies such as $5^{th}$ Generation (5G), New Radio (NR), Internet of Things (IoT) and Narrow Band Internet of Things (NB-IoT). These communication technologies are developed for higher speed transmission and serving for huge number of devices including machine type devices.

In some communication systems, in order to perform a non-access stratum (NAS) signaling procedure, the UE may need to establish a NAS signaling connection with the network apparatus. When the NAS signaling procedure is finished, it is supposed that there is no other data needed for transmission. Then, the UE should be waiting for the network apparatus to release the signaling connection or the UE should locally release the signaling connection. However, during the period of waiting for signaling connection release, there may be a mobile-terminated (MT) circuit-switched (CS) call coming. It is not clear how the UE should deal with the incoming MT CS call since the signaling connection is going to be released.

Accordingly, it is important for the UE to properly deal with the conflict between the incoming MT CS call and the release of the signaling connection. Therefore, in developing communication systems, it is needed to provide proper mechanisms for arbitrating such conflict.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to avoiding circuit-switched call drop with respect to user equipment and network apparatus in mobile communications.

In one aspect, a method may involve an apparatus transmitting a non-access stratum (NAS) message in a NAS signaling connection. The method may also involve the apparatus receiving a NAS response message. The method may further involve the apparatus initiating a timer to control the NAS signaling connection. The method may further involve the apparatus receiving a circuit-switched (CS) service notification. The method may further involve the apparatus stopping the timer and executing a CS service procedure.

In one aspect, an apparatus may comprise a transceiver capable of wirelessly communicating with a plurality of nodes of a wireless network. The apparatus may also comprise a processor communicatively coupled to the transceiver. The processor may be capable of transmitting a non-access stratum (NAS) message in a NAS signaling connection. The processor may also be capable of receiving a NAS response message. The processor may further be capable of initiating a timer to control the NAS signaling connection. The processor may further be capable of receiving a circuit-switched (CS) service notification. The processor may further be capable of stopping the timer and executing a CS service procedure.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to avoiding circuit-switched call drop with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Figure 1:
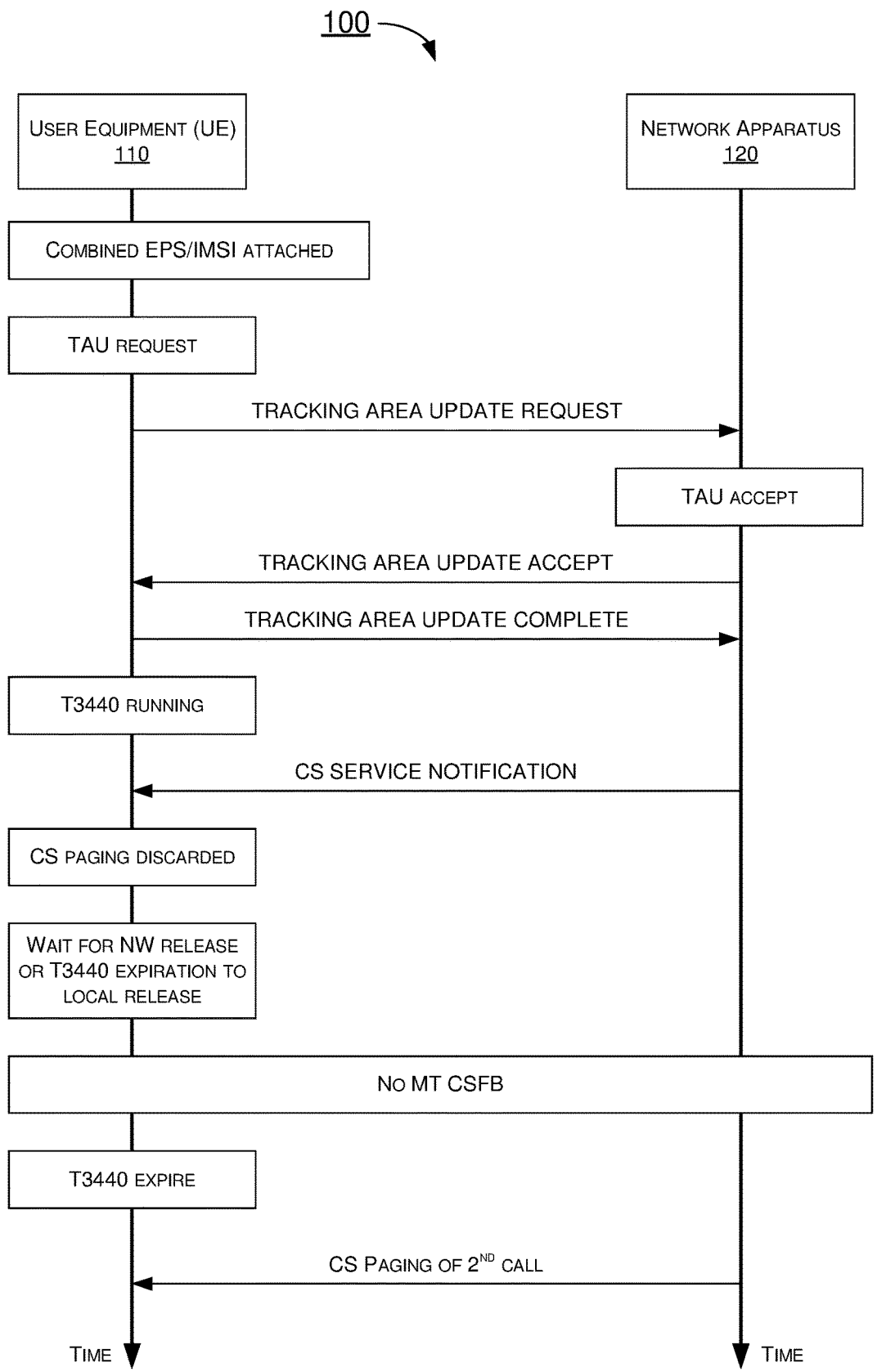
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a user equipment (UE) 110 and a network apparatus 120, which may be a part of a wireless communication network (e.g., a Long Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). In order to perform a non-access stratum (NAS) signaling procedure, UE 110 may need to establish a NAS signaling connection with network apparatus 120. UE 110 may be configured to initiate an attach procedure such as a combined evolved packet system (EPS)/international mobile subscriber identity (IMSI) attach procedure. After the attach procedure, a NAS signaling connection may be established between UE 110 and network apparatus 120. UE 110 may be in a connected state or a connected mode.

UE 110 may be configured to initiate a tracking area update (TAU) procedure. UE 110 may transmit a tracking area update (TAU) request message without an active flag to network apparatus 120. After receiving the TAU request, network apparatus 120 may accept the request and transmit a TAU accept message to UE 110. UE 110 may further transmit a TAU complete message to network apparatus 120 to finish the TAU procedure. The active flag may be used to indicate whether any other data needs to be transmitted after the TAU procedure. In an event that UE 110 does not indicate the active flag in the TAU request message, it means that UE 110 has no data needed to be transmitted. Network apparatus 120 may further indicate UE 110 to start a timer to control the established NAS signaling connection in the TAU accept message. After receiving the TAU accept message, UE 110 may further be configured to initiate a timer T3440. The timer value of the timer T3440 may be configured, for example and without limitation, 10 seconds. The timer T3440 may be configured to control release of the signaling connection. Since there is no data for transmission, UE 110 may initiate the timer T3440 to wait for release of the signaling connection initiated by network apparatus 120. If network apparatus 120 does not release the signaling connection, UE 110 should locally release the signaling connection.

Before expiration of the timer T3440, there may be a mobile-terminated (MT) CS call coming. Network apparatus 120 may transmit a CS service notification message to inform UE 110 the incoming MT CS call. However, since the timer T3440 is still running, UE 110 is waiting for release of the signaling connection from network apparatus 120 or expiration of the timer T3440 to local release the signaling connection. UE 110 may be configured to discard the CS service notification message or any CS paging. At this stage, no MT circuit-switched fallback (CSFB) will be performed. When the timer T3440 expires, UE 110 may be configured to local release the signaling connection with network apparatus 120. Since the signaling connection is released, the MT CS call may be dropped or failed. UE 110 may enter into an idle mode. The peer end may only have to re-initiate a second CS call. Network apparatus may only send a paging message to UE 110 for the second CS call. Accordingly, in view of the UE behaviors when the timer T3440 is running, MT CS service calls may suffer failure or delay even when the UE is in a connected state.

Figure 2:
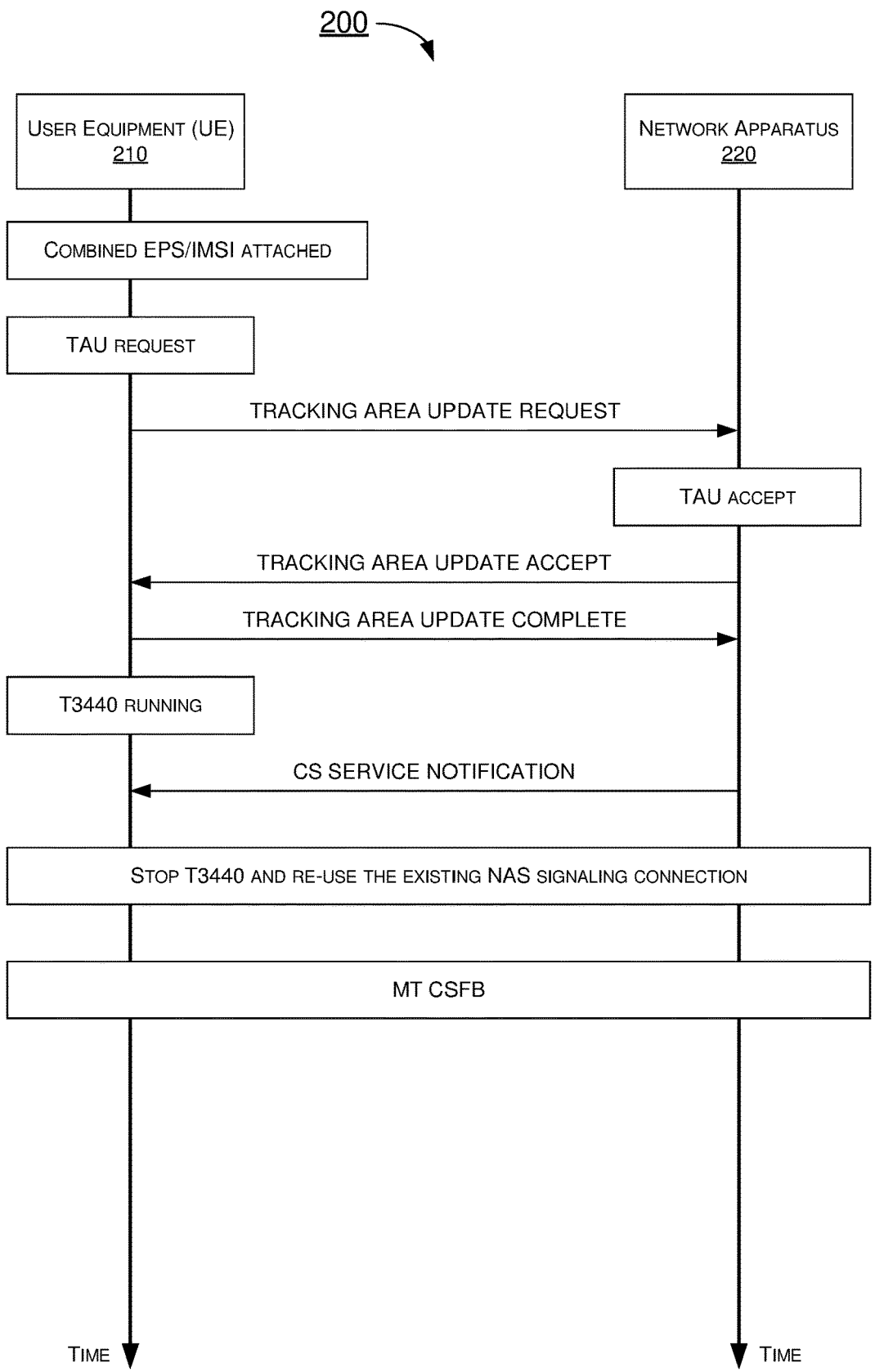
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE 210 and a network apparatus 220, which may be a part of a wireless communication network (e.g., a Long Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). In order to perform a NAS signaling procedure, UE 210 may need to establish a NAS signaling connection with network apparatus 220. UE 210 may be configured to initiate an attach procedure such as a combined EPS/IMSI attach procedure. After the attach procedure, a NAS signaling connection may be established between UE 210 and network apparatus 220. UE 210 may be in a connected state or a connected mode.

UE 210 may be configured to initiate a NAS signaling procedure. UE 210 may transmit a NAS message (e.g., a TAU request message without an active flag) to network apparatus 220. After receiving the NAS message, network apparatus 220 may accept the request and transmit a NAS response message (e.g., a TAU accept message) to UE 210. UE 210 may further transmit a TAU complete message to network apparatus 220 to finish the TAU procedure. Network apparatus 220 may indicate UE 210 to start a timer to control the established NAS signaling connection in the TAU accept message. After receiving the TAU accept message, UE 210 may further be configured to initiate a timer T3440. The timer value of the timer T3440 may be configured, for example and without limitation, 10 seconds. The timer T3440 may be configured to control release of the signaling connection. Since there is no data for transmission, UE 210 may initiate the timer T3440 to wait for release of the signaling connection initiated by network apparatus 220. If network apparatus 220 does not release the signaling connection, UE 210 should locally release the signaling connection.

Before expiration of the timer T3440, there may be a MT CS call coming. Network apparatus 220 may transmit a CS service notification message to inform UE 210 the incoming MT CS call. According to implementations of the present disclosure, after receiving the CS service notification message, UE 210 may be configured to stop the timer T3440 and re-use the existing NAS signaling connection to execute the CS service procedure. Specifically, UE 210 may be configured to perform a CSFB procedure to fallback to a CS service network to execute the CS service procedure. Accordingly, UE 210 may be able to take the MT CS call by using the existing signaling connection. By such design, MT CS call failure may be avoided and the call delay may also be reduced up to 10 seconds (e.g., timer value of the timer T3440).

Figure 3:
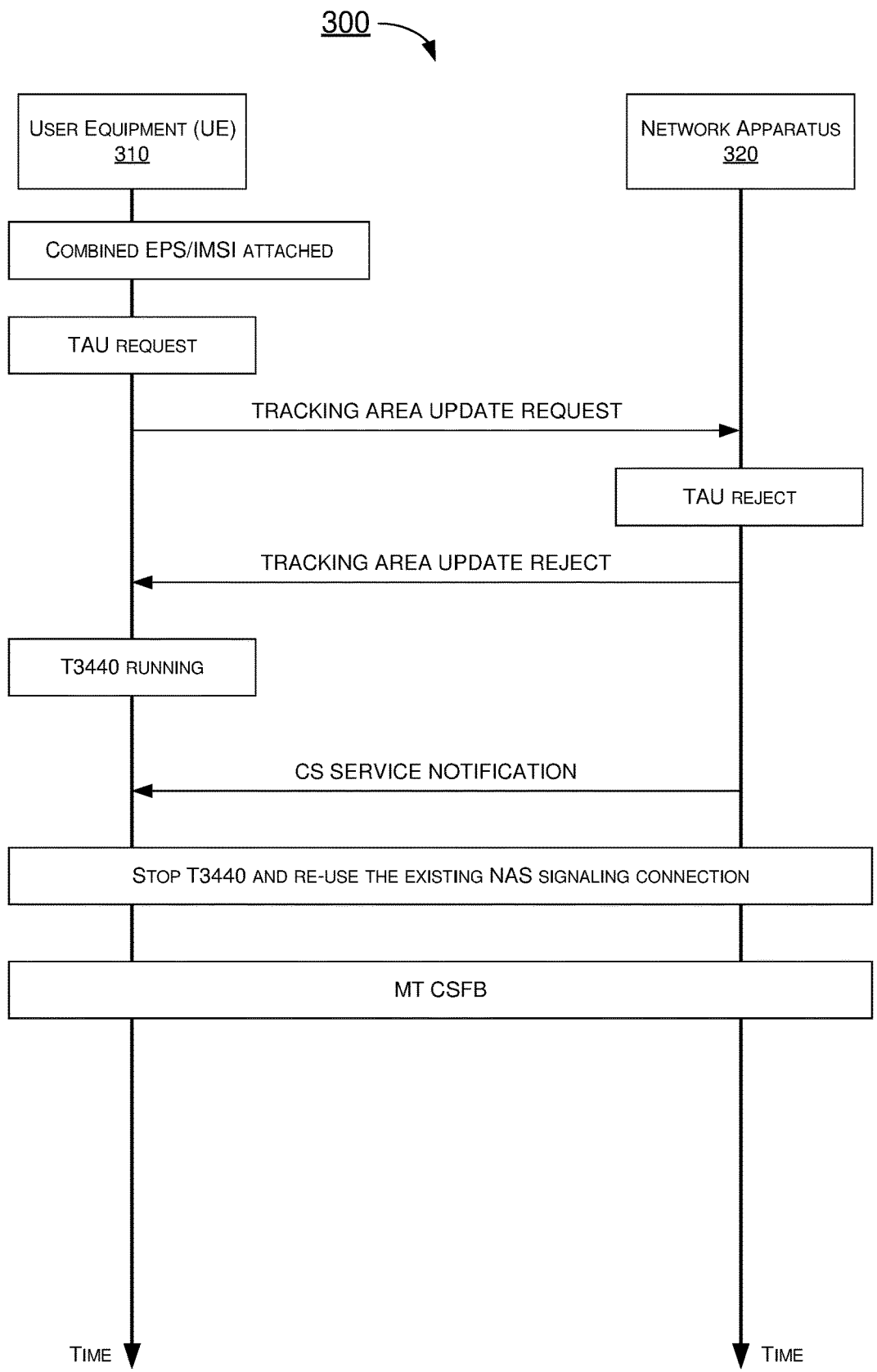
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE 310 and a network apparatus 320, which may be a part of a wireless communication network (e.g., a Long Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). In order to perform a NAS signaling procedure, UE 310 may need to establish a NAS signaling connection with network apparatus 320. UE 310 may be configured to initiate an attach procedure such as a combined EPS/IMSI attach procedure. After the attach procedure, a NAS signaling connection may be established between UE 310 and network apparatus 320. UE 310 may be in a connected state or a connected mode.

UE 310 may be configured to initiate a NAS signaling procedure. UE 310 may transmit a NAS message (e.g., a TAU request message without an active flag) to network apparatus 320. After receiving the NAS message, network apparatus 320 may reject the request and transmit a NAS response message (e.g., a TAU reject message) to UE 310. Network apparatus 320 may indicate UE 310 to start a timer to control the established NAS signaling connection in the TAU reject message. After receiving the TAU reject message, UE 310 may further be configured to initiate a timer T3440. The timer value of the timer T3440 may be configured, for example and without limitation, 10 seconds. The timer T3440 may be configured to control release of the signaling connection. Since there is no data for transmission, UE 310 may initiate the timer T3440 to wait for release of the signaling connection initiated by network apparatus 320. If network apparatus 320 does not release the signaling connection, UE 310 should locally release the signaling connection.

Before expiration of the timer T3440, there may be a MT CS call coming. Network apparatus 320 may transmit a CS service notification message to inform UE 310 the incoming MT CS call. According to implementations of the present disclosure, after receiving the CS service notification message, UE 310 may be configured to stop the timer T3440 and re-use the existing NAS signaling connection to execute the CS service procedure. Specifically, UE 310 may be configured to perform a CSFB procedure to fallback to a CS service network to execute the CS service procedure. Accordingly, UE 310 may be able to take the MT CS call by using the existing signaling connection. By such design, MT CS call failure may be avoided and the call delay may also be reduced up to 10 seconds (e.g., timer value of the timer T3440).

Figure 4:
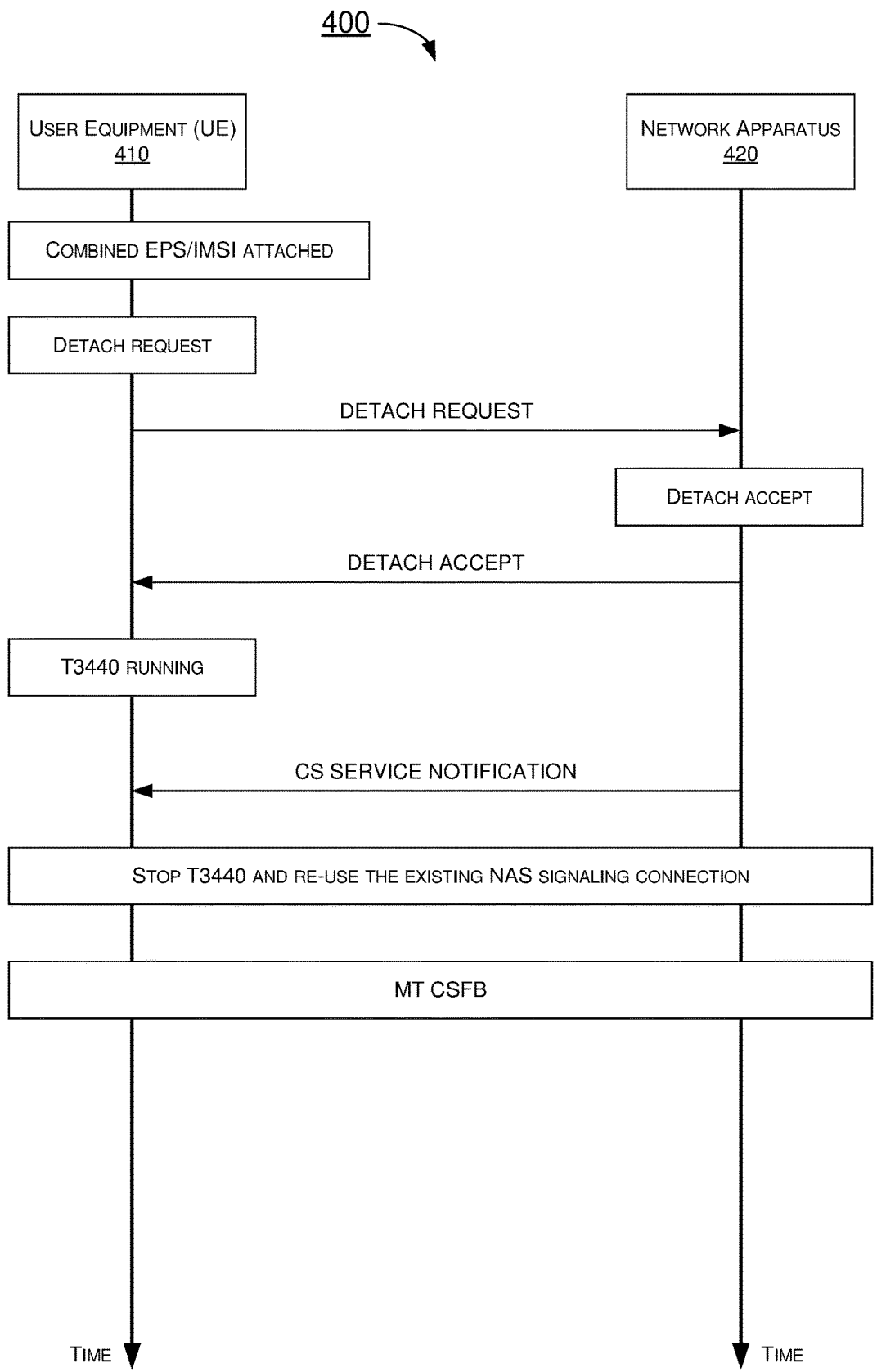
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE 410 and a network apparatus 420, which may be a part of a wireless communication network (e.g., a Long Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). In order to perform a NAS signaling procedure, UE 410 may need to establish a NAS signaling connection with network apparatus 420. UE 410 may be configured to initiate an attach procedure such as a combined EPS/IMSI attach procedure. After the attach procedure, a NAS signaling connection may be established between UE 410 and network apparatus 420. UE 410 may be in a connected state or a connected mode.

UE 410 may be configured to initiate a NAS signaling procedure. UE 410 may transmit a NAS message (e.g., a detach request message) to network apparatus 420. After receiving the NAS message, network apparatus 420 may accept the request and transmit a NAS response message (e.g., a detach accept message) to UE 410. Network apparatus 420 may indicate UE 410 to start a timer to control the established NAS signaling connection in the detach accept message. After receiving the detach accept message, UE 410 may further be configured to initiate a timer T3440. The timer value of the timer T3440 may be configured, for example and without limitation, 10 seconds. The timer T3440 may be configured to control release of the signaling connection. Since there is no data for transmission, UE 410 may initiate the timer T3440 to wait for release of the signaling connection initiated by network apparatus 420. If network apparatus 420 does not release the signaling connection, UE 410 should locally release the signaling connection.

Before expiration of the timer T3440, there may be a MT CS call coming. Network apparatus 420 may transmit a CS service notification message to inform UE 410 the incoming MT CS call. According to implementations of the present disclosure, after receiving the CS service notification message, UE 410 may be configured to stop the timer T3440 and re-use the existing NAS signaling connection to execute the CS service procedure. Specifically, UE 410 may be configured to perform a CSFB procedure to fallback to a CS service network to execute the CS service procedure. Accordingly, UE 410 may be able to take the MT CS call by using the existing signaling connection. By such design, MT CS call failure may be avoided and the call delay may also be reduced up to 10 seconds (e.g., timer value of the timer T3440).

Figure 5:
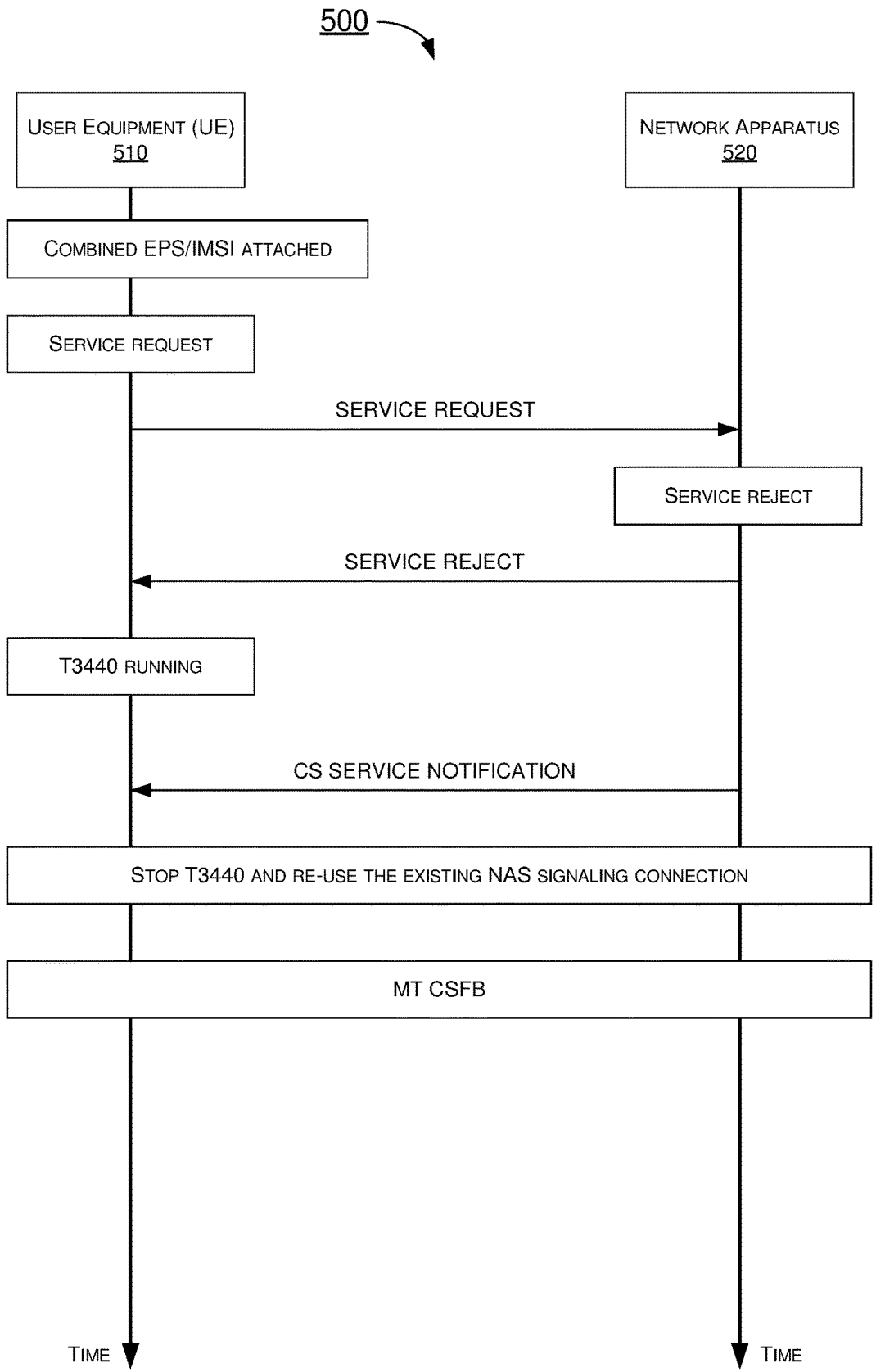
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE 510 and a network apparatus 520, which may be a part of a wireless communication network (e.g., a Long Term Evolution (LTE) network, a LTE-Advanced network, a LTE-Advanced Pro network, a 5$^{th}$ Generation (5G) network, a New Radio (NR) network, an Internet of Things (IoT) network or a Narrow Band Internet of Things (NB-IoT) network). In order to perform a NAS signaling procedure, UE 510 may need to establish a NAS signaling connection with network apparatus 520. UE 510 may be configured to initiate an attach procedure such as a combined EPS/IMSI attach procedure. After the attach procedure, a NAS signaling connection may be established between UE 510 and network apparatus 520. UE 510 may be in a connected state or a connected mode.

UE 510 may be configured to initiate a NAS signaling procedure. UE 510 may transmit a NAS message (e.g., a service request message) to network apparatus 520. After receiving the NAS message, network apparatus 520 may reject the request and transmit a NAS response message (e.g., a service reject message) to UE 510. The service reject message may further comprise a reject cause number for specifying the reason of rejection. The reject cause number may comprise, for example and without limitation, a reject cause #9, a reject cause #10, a reject cause #39 or a reject cause #40. Network apparatus 520 may indicate UE 510 to start a timer to control the established NAS signaling connection in the service reject message. After receiving the service reject message, UE 510 may further be configured to initiate a timer T3440. The timer value of the timer T3440 may be configured, for example and without limitation, 10 seconds. The timer T3440 may be configured to control release of the signaling connection. Since there is no data for transmission, UE 510 may initiate the timer T3440 to wait for release of the signaling connection initiated by network apparatus 520. If network apparatus 520 does not release the signaling connection, UE 510 should locally release the signaling connection.

Before expiration of the timer T3440, there may be a MT CS call coming. Network apparatus 520 may transmit a CS service notification message to inform UE 510 the incoming MT CS call. According to implementations of the present disclosure, after receiving the CS service notification message, UE 510 may be configured to stop the timer T3440 and re-use the existing NAS signaling connection to execute the CS service procedure. Specifically, UE 510 may be configured to perform a CSFB procedure to fallback to a CS service network to execute the CS service procedure. Accordingly, UE 510 may be able to take the MT CS call by using the existing signaling connection. By such design, MT CS call failure may be avoided and the call delay may also be reduced up to 10 seconds (e.g., timer value of the timer T3440).

In some implementations, before expiration of the timer T3440, there may be a mobile-originated (MO) CS call initiated. Specifically, when the timer T3440 is running, the UE may be operated by a user to initiate a MO CS call. The processor of the UE may receive a CS service notification which may be a MO CS call request. According to implementations of the present disclosure, after receiving the MO CS call request, the UE may be configured to stop the timer T3440 and re-use the existing NAS signaling connection to execute the CS service procedure. The UE may be configured to perform a CSFB procedure to fallback to a CS service network to execute the CS service procedure. Accordingly, the UE may be able to initiate the MO CS call by using the existing signaling connection. By such design, MO CS call failure may be avoided and the call delay may also be reduced.

In some implementations, after the NAS signaling connection is established between the UE and the network apparatus, the UE may be in an evolved packet system mobility management (EMM)-connected mode. When the UE transmits a NAS message or receives a NAS response message, the UE may move to an EMM-service-request-initiated state. In the EMM-service-request-initiated state, when the UE receives a CS service notification message from the network apparatus, the UE may be configured to stop the timer T3440 and re-use the existing NAS signaling connection to execute the CS service procedure.

Illustrative Implementations

Figure 6:
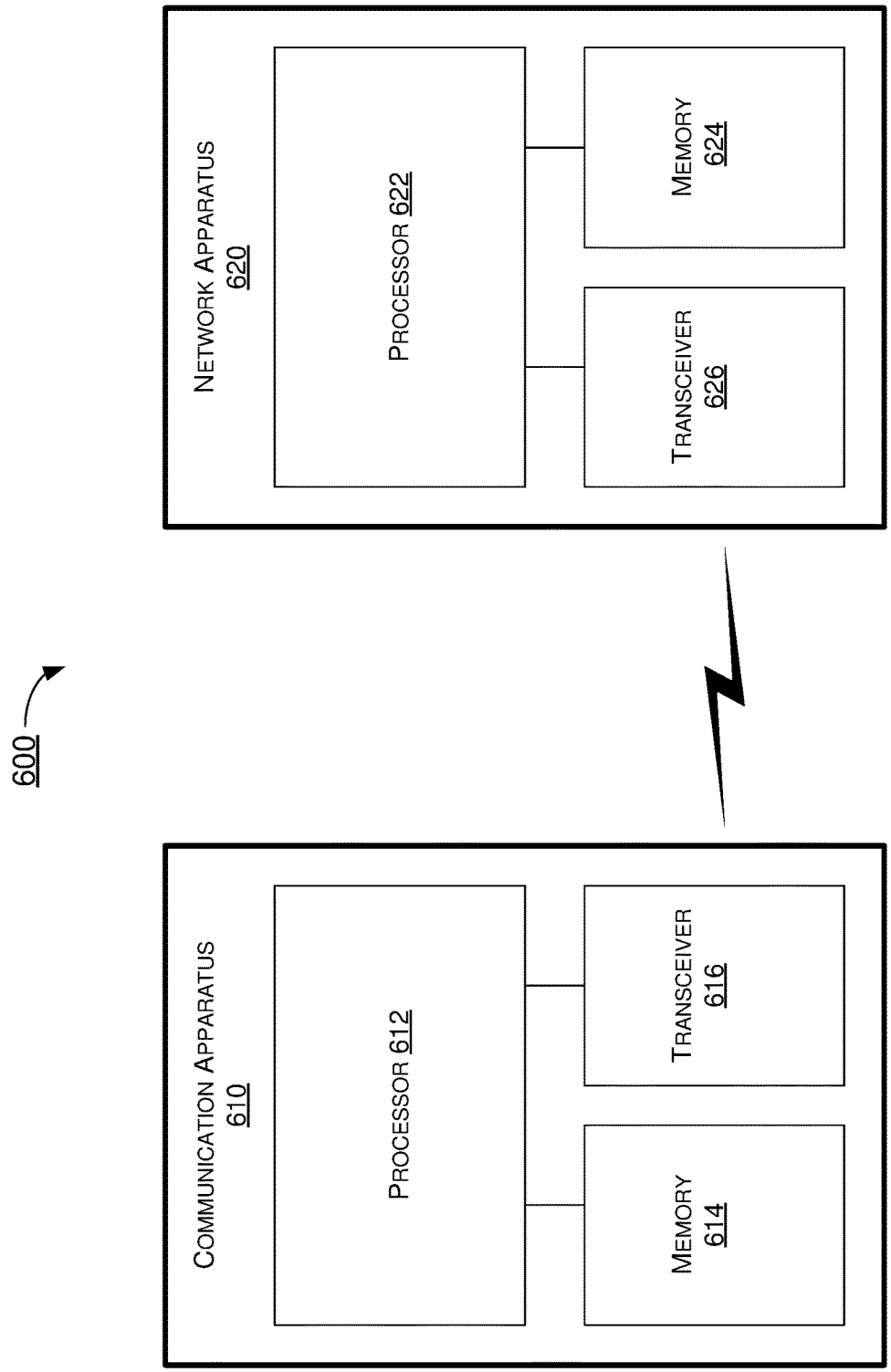
FIG. 6 is a block diagram of an example communication apparatus and an example network apparatus in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to avoiding circuit-switched call drop with respect to user equipment and network apparatus in wireless communications, including scenarios 200, 300, 400 and 500 described above as well as process 700 described below.

Communication apparatus 610 may be a part of an electronic apparatus, which may be a user equipment (UE) such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT or NB-IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, or one or more complex-instruction-set-computing (CISC) processors. Communication apparatus 610 may include at least some of those components shown in FIG. 6 such as a processor 612, for example. communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in a LTE, LTE-Advanced or LTE-Advanced Pro network or in a gNB in a 5G, NR, IoT or NB-IoT network. Alternatively, network apparatus 620 may be implemented in the form of one or more IC chips such as, for example and without limitation, one or more single-core processors, one or more multi-core processors, or one or more CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, communication apparatus 610 may need to establish a NAS signaling connection with network apparatus 620. Processor 612 may be configured to initiate an attach procedure such as a combined EPS/IMSI attach procedure. After the attach procedure, a NAS signaling connection may be established between communication apparatus 610 and network apparatus 620. Processor 612 may be in a connected state or a connected mode.

In some implementations, processor 612 may be configured to initiate a NAS signaling procedure. Processor 612 may be configured to transmit a NAS message (e.g., a TAU request message, a detach request message or a service request message) to network apparatus 620. After receiving the NAS message, processor 622 may transmit a NAS response message (e.g., a TAU accept message, a TAU reject message, a detach accept message or a service reject message) to communication apparatus 610. Processor 622 may be configured to indicate communication apparatus 610 to start a timer to control the established NAS signaling connection in the NAS response message. After receiving the NAS response, processor 612 may further be configured to initiate a timer T3440. The timer value of the timer T3440 may be configured, for example and without limitation, 10 seconds. Processor 612 may configure the timer T3440 to control release of the signaling connection. Since there is no data for transmission, processor 612 may initiate the timer T3440 to wait for release of the signaling connection initiated by network apparatus 620. If network apparatus 620 does not release the signaling connection, processor 612 should locally release the signaling connection.

In some implementations, before expiration of the timer T3440, there may be a MT CS call coming. Processor 622 may transmit a CS service notification message to inform communication apparatus 610 the incoming MT CS call. After receiving the CS service notification message, processor 612 may be configured to stop the timer T3440 and re-use the existing NAS signaling connection to execute the CS service procedure. Specifically, processor 612 may be configured to perform a CSFB procedure to fallback to a CS service network to execute the CS service procedure. Accordingly, processor 612 may be able to take the MT CS call by using the existing signaling connection.

In some implementations, before expiration of the timer T3440, there may be a MO CS call initiated. Specifically, when the timer T3440 is running, processor 612 may be configured to initiate a MO CS call in response to operations by a user. Processor 612 may receive a CS service notification which may be a MO CS call request. After receiving the MO CS call request, processor 612 may be configured to stop the timer T3440 and re-use the existing NAS signaling connection to execute the CS service procedure. Processor 612 may be configured to perform a CSFB procedure to fallback to a CS service network to execute the CS service procedure. Accordingly, processor 612 may be able to initiate the MO CS call by using the existing signaling connection.

In some implementations, after the NAS signaling connection is established between communication apparatus 610 and the network apparatus 620, processor 612 may be in an evolved packet system mobility management (EMM)-connected mode. When processor 612 transmits a NAS message or receives a NAS response message, processor 612 may move to an EMM-service-request-initiated state. In the EMM-service-request-initiated state, when processor 612 receives a CS service notification message from the network apparatus, processor 612 may be configured to stop the timer T3440 and re-use the existing NAS signaling connection to execute the CS service procedure.

Illustrative Processes

Figure 7:
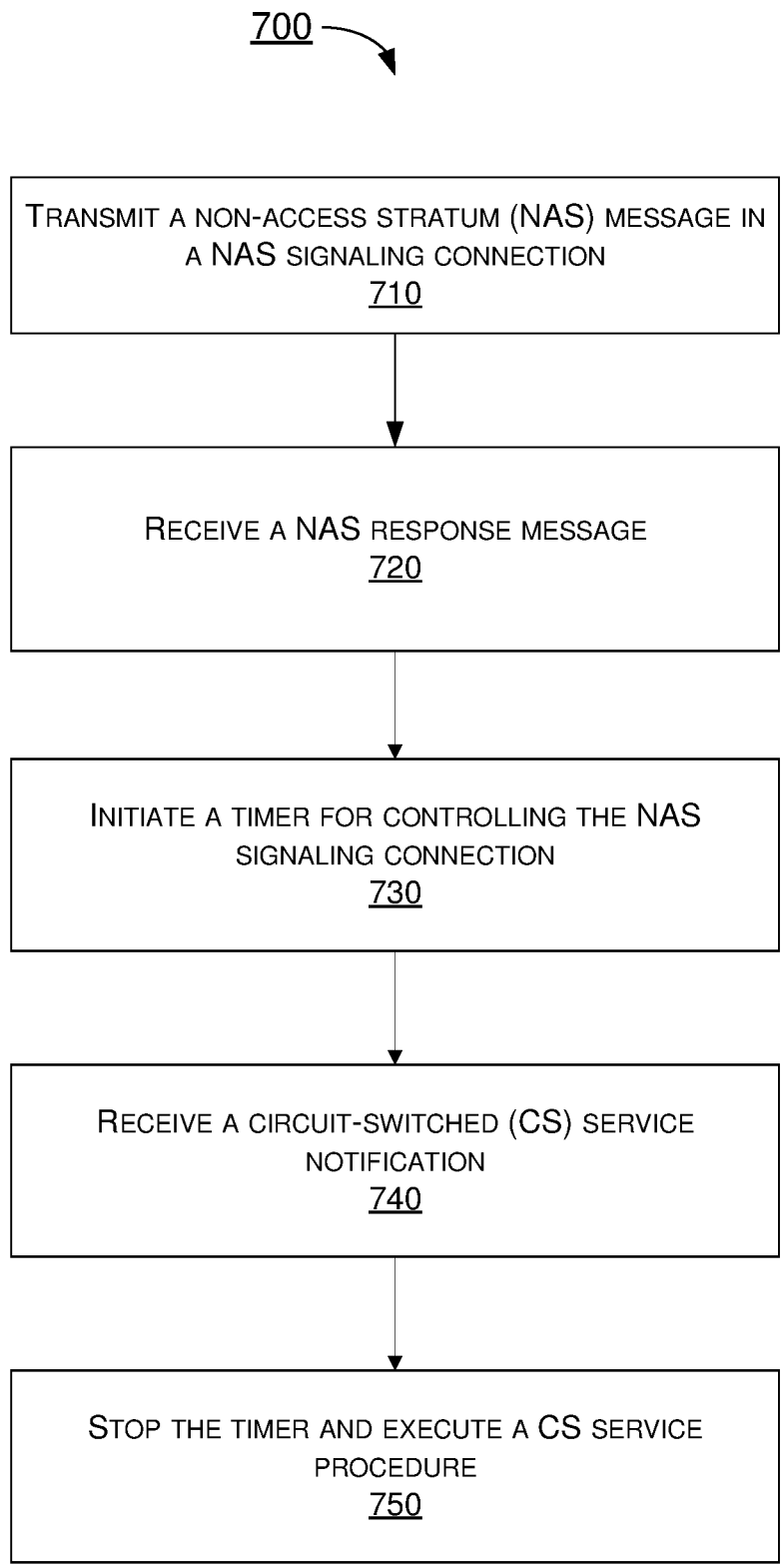
FIG. 7 is a flowchart of an example process in accordance with an implementation of the present disclosure.

FIG. 7 illustrates an example process 700 in accordance with an implementation of the present disclosure. Process 700 may be an example implementation of scenarios 200, 300, 400 and 500, whether partially or completely, with respect to avoiding circuit-switched call drop in accordance with the present disclosure. Process 700 may represent an aspect of implementation of features of communication apparatus 610. Process 700 may include one or more operations, actions, or functions as illustrated by one or more of blocks 710, 720, 730, 740 and 750. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve communication apparatus 610 transmitting a non-access stratum (NAS) message in a NAS signaling connection. Process 700 may proceed from 710 to 720.

At 720, process 700 may involve communication apparatus 610 receiving a NAS response message. Process 700 may proceed from 720 to 730.

At 730, process 700 may involve communication apparatus 610 initiating a timer to control the NAS signaling connection. Process 700 may proceed from 730 to 740.

At 740, process 700 may involve communication apparatus 610 receiving a circuit-switched (CS) service notification. Process 700 may proceed from 740 to 750.

At 750, process 700 may involve communication apparatus 610 stopping the timer and executing a CS service procedure.

In some implementations, process 700 may involve communication apparatus 610 executing the CS service procedure by re-using the NAS signaling connection.

In some implementations, the NAS message may comprise at least one of a tracking area update (TAU) request message, a detach request message or a service request message. The NAS response message may comprise at least one of a TAU accept message, a TAU reject message, a detach accept message or a service reject message.

In some implementations, the timer to control the NAS signaling connection may comprise T3440. The CS service notification may comprise a mobile-terminated (MT) CS call indication or a mobile-originated (MO) CS call request.

In some implementations, process 700 may involve communication apparatus 610 performing a circuit-switched fallback (CSFB) procedure to execute the CS service procedure.

In some implementations, process 700 may involve communication apparatus 610 releasing the NAS signaling connection in response to expiration of the timer.

In some implementations, process 700 may involve communication apparatus 610 stopping the timer upon receiving the CS service notification in an evolved packet system mobility management (EMM)-service-request-initiated state.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
transmitting, by a processor of an apparatus, a non-access stratum (NAS) message in a NAS signaling connection;
receiving, by the processor, a NAS response message;
initiating, by the processor, a timer according to the NAS response message to control the NAS signaling connection by releasing the NAS signaling connection upon expiration of the timer;
receiving, by the processor, a circuit-switched (CS) service notification; and
stopping, by the processor responsive to receiving the CS service notification and before expiration of the timer, the timer to re-use the NAS signaling connection to execute a CS service procedure.

2. The method of claim 1, wherein the executing comprises executing the CS service procedure by re-using the NAS signaling connection.

3. The method of claim 1, wherein the NAS message comprises at least one of a tracking area update (TAU) request message, a detach request message or a service request message.

4. The method of claim 1, wherein the NAS response message comprises at least one of a TAU accept message, a TAU reject message, a detach accept message or a service reject message.

5. The method of claim 1, wherein the timer that controls the NAS signaling connection comprises T3440.

6. The method of claim 1, wherein the CS service notification comprises a mobile-terminated (MT) CS call indication.

7. The method of claim 1, wherein the CS service notification comprises a mobile-originated (MO) CS call request.

8. The method of claim 1, further comprising:
performing, by the processor, a circuit-switched fallback (CSFB) procedure to execute the CS service procedure.

9. The method of claim 1, further comprising:
releasing, by the processor, the NAS signaling connection in response to expiration of the timer.

10. The method of claim 1, wherein the stopping comprises stopping the timer upon receiving the CS service notification in an evolved packet system mobility management (EMM)-service-request-initiated state.

11. An apparatus, comprising:
a transceiver capable of wirelessly communicating with a plurality of nodes of a wireless network; and
a processor communicatively coupled to the transceiver, the processor capable of:
transmitting, via the transceiver, a non-access stratum (NAS) message in a NAS signaling connection;
receiving, via the transceiver, a NAS response message;
initiating a timer according to the NAS response message to control the NAS signaling connection by releasing the NAS signaling connection upon expiration of the timer;
receiving, via the transceiver, a circuit-switched (CS) service notification; and
stopping, responsive to receiving the CS service notification and before expiration of the timer, the timer to re-use the NAS signaling connection to execute a CS service procedure.

12. The apparatus of claim 11, wherein, in executing the CS service procedure, the processor is capable of executing the CS service procedure by re-using the NAS signaling connection.

13. The apparatus of claim 11, wherein the NAS message comprises at least one of a tracking area update (TAU) request message, a detach request message or a service request message.

14. The apparatus of claim 11, wherein the NAS response message comprises at least one of a TAU accept message, a TAU reject message, a detach accept message or a service reject message.

15. The apparatus of claim 11, wherein the timer for controlling the NAS signaling connection comprises T3440.

16. The apparatus of claim 11, wherein the CS service notification comprises a mobile-terminated (MT) CS call indication.

17. The apparatus of claim 11, wherein the CS service notification comprises a mobile-originated (MO) CS call request.

18. The apparatus of claim 11, wherein the processor is further capable of:
performing a circuit-switched fallback (CSFB) procedure to execute the CS service procedure.

19. The apparatus of claim 11, wherein the processor is further capable of:
releasing the NAS signaling connection in response to expiration of the timer.

20. The apparatus of claim 11, wherein, in stopping the timer, the processor is capable of stopping the timer upon receiving the CS service notification in an evolved packet system mobility management (EMM)-service-request-initiated state.

* * * * *